(12) United States Patent
Nekhoroshev

(10) Patent No.: US 9,336,384 B2
(45) Date of Patent: May 10, 2016

(54) SYSTEMS AND METHODS FOR REPLACING APPLICATION METHODS AT RUNTIME

(71) Applicant: Symantec Corporation, Mountain View, CA (US)

(72) Inventor: Vadim Nekhoroshev, Tallinn (EE)

(73) Assignee: Symantec Corporation, Mountain View, CA (US)

( * ) Notice: Subject to any disclaimer, the term of this patent is extended or adjusted under 35 U.S.C. 154(b) by 226 days.

(21) Appl. No.: 13/869,921

(22) Filed: Apr. 24, 2013

(65) Prior Publication Data

US 2014/0325664 A1    Oct. 30, 2014

(51) Int. Cl.
| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |
| *G06F 21/52* | (2013.01) | |
| *G06F 9/445* | (2006.01) | |

(52) U.S. Cl.
CPC . *G06F 21/52* (2013.01); *G06F 8/67* (2013.01)

(58) Field of Classification Search
CPC .................................. G06F 21/52; G06F 8/67
USPC ............................................................. 726/4
See application file for complete search history.

(56) References Cited

U.S. PATENT DOCUMENTS

| | | | | |
|---|---|---|---|---|
| 5,727,215 A * | 3/1998 | Rynaski | ..................... | G06F 8/65 712/E9.007 |
| 6,308,182 B1 * | 10/2001 | Nishigaya | ................. | G06F 8/67 |
| 6,892,230 B1 * | 5/2005 | Gu | ..................... | H04L 12/2805 370/254 |
| 7,669,238 B2 * | 2/2010 | Fee | ......................... | G06F 21/51 380/29 |
| 8,806,469 B2 * | 8/2014 | Jones | ....................... | G06F 8/67 717/168 |
| 2006/0005171 A1 * | 1/2006 | Ellison | ..................... | G06F 8/67 717/131 |
| 2006/0242491 A1 * | 10/2006 | Axnix | ...................... | G06F 8/67 714/718 |
| 2008/0222618 A1 | 9/2008 | Valtchev | | |
| 2009/0249368 A1 | 10/2009 | Needamangala et al. | | |
| 2014/0181974 A1 * | 6/2014 | Yablokov | ............. | G06F 21/566 726/23 |

OTHER PUBLICATIONS

Android Developers Blog, "Custom Class Loading in Dalvik," by Fred Chung. Published: Jul. 28, 2011.*
Hunt, Galen et al., "Detours: Binary Interception of Win32 Functions", ftp://ftp.research.microsoft.com/pub/tr/tr-98-33.pdf, as accessed on Sep. 3, 2014, Technical Report MSR-TR-98-33, Microsoft Research, Microsoft Corporation, Redmond, WA, (Feb. 1999).

(Continued)

*Primary Examiner* — Dant Shaifer Harriman
(74) *Attorney, Agent, or Firm* — ALG Intellectual Property, LLC

(57) ABSTRACT

A computer-implemented method for replacing application methods at runtime may include identifying an application at runtime that includes a target method to replace at runtime with a source method, locating a target address of a target method data structure (that includes a target code pointer to method code of the target method) within memory at runtime that is referenced by a target class, determining a source address of a source method data structure (that includes a source code pointer to method code of the source method) within memory at runtime that describes the source method, and modifying the application at runtime to have the target class reference the source method instead of the target method by copying the source method data structure from the source address to the target address and, thereby, replacing the target code pointer with the source code pointer. Various other methods and systems are also disclosed.

20 Claims, 7 Drawing Sheets

(56) References Cited

OTHER PUBLICATIONS

OW2 Consortium—Leading Open Source Middleware; ASMDEX; http://asm.ow2.org/asmdex-index.html; Released Mar. 31, 2012; As Accessed on Feb. 20, 2013.

Apache Commons; BCEL; http://commons.apache.org/proper/commons-bcel/index.html; Published Oct. 17, 2011; As accessed on Feb. 20, 2013.

Shigeru Chiba; Javassist; http://www.csgis.titech.ac.jp/~chiba/javassist/; Dec. 3, 2012; As accessed on Feb. 20, 2013.

* cited by examiner

SYSTEMS AND METHODS FOR REPLACING APPLICATION METHODS AT RUNTIME

BACKGROUND

In the information age, a large number of software applications are available to businesses and consumers to assist them in performing a wide variety of tasks. Unfortunately, not all applications may be trustworthy or invulnerable to exploits or security leaks. For example, an attacker may leverage an applications to install malware or gain root access to a device.

Some application security risks may be addressed on the method level. For example, a security vendor may add a wrapper to a method within an application, so the wrapper can intercept calls to the method and examine the context in which the method was called and/or sanitize parameters passed to the method. Some platforms may provide application programming interfaces for provisioning wrapper methods in applications; however, other platforms for which a security vendor may wish to provide protection may not provide such application programming interfaces. Some traditional techniques for modifying applications may involve decompiling and recompiling portions of executable files and/or byte code. Unfortunately, these techniques may involve an undesirable consumption of computing resources and/or may provide insufficient flexibility in modifying applications while in execution.

Accordingly, the instant disclosure identifies and addresses a need for additional and improved systems and methods for replacing application methods at runtime.

SUMMARY

As will be described in greater detail below, the instant disclosure generally relates to systems and methods for replacing application methods at runtime by replacing, in memory, a target method data structure (referenced by a target class) that includes a code pointer to the executable code of a target method with a source method data structure (e.g., referenced by a source class) that includes a code pointer to the executable code of a source method. In some examples, these systems and methods may also first copy the target method data structure to a dummy method data structure (e.g., also referenced by the source class) to enable the source method to act as a wrapper method and call the target method as appropriate. In some examples, these systems and methods may replace methods of applications that run inside a virtual machine used to execute applications written in a particular programming language. For example, these systems and methods may replace methods of an application that runs inside a DALVIK virtual machine that executes applications written in the JAVA language.

In one example, a computer-implemented method for replacing application methods at runtime may include (1) identifying a class-based object-oriented application at runtime that may include a target method to replace at runtime with a source method, (2) locating a target address of a target method data structure within memory at runtime that describes the target method and may be referenced by a target class within the application, the target method data structure including a target code pointer to method code of the target method, (3) determining a source address of a source method data structure within memory at runtime that describes the source method, the source method data structure including a source code pointer to method code of the source method and (4) modifying the application at runtime to have the target class reference the source method in place of the target method by copying at least a portion of the source method data structure from the source address of the source method data structure to the target address of the target method data structure and, thereby, replacing the target code pointer with the source code pointer.

In one embodiment, the computer-implemented method may further include (1) identifying a source class that references the source method data structure that describes the source method, (2) determining that the source class references a placeholder method data structure that describes a private, non-native placeholder method and (3) copying, before copying the portion of the source method data structure to the target address, at least a portion of the target method data structure from the target address of the target method data structure to a placeholder address of the placeholder method data structure and, thereby, saving the target code pointer for use in the source method.

In one embodiment, the source method may include at least one instruction to execute the target method by calling the placeholder method.

In one embodiment, the target method may be untrusted and the source method may include a wrapper method with at least one instruction to prevent an insecure use of the target method.

In one embodiment, the computer-implemented method may further include (1) determining that the target class may be not initialized and (2) initializing the target class before copying the portion of the source method data structure.

In some examples, the computer-implemented method may further include resolving the target method in the target class before copying the source method data structure.

In some examples, resolving the target method in the target class may include: (1) identifying an index of the target method for a reference table of the target class and (2) storing the target address of the target method data structure to a resolved method table at the index.

In one embodiment, (1) a name of the source method may match a name of the target method and (2) a parameter set of the source method may match a parameter set of the target method.

In one embodiment, modifying the application at runtime to have the target class reference the source method in place of the target method may include modifying the application at runtime without recompiling the source class and without recompiling the target class.

In one embodiment, a system for implementing the above-described method may include (1) an identification module that identifies a class-based object-oriented application at runtime that may include a target method to replace at runtime with a source method, (2) a location module that locates a target address of a target method data structure within memory at runtime that describes the target method and may be referenced by a target class within the application, the target method data structure including a target code pointer to method code of the target method, (3) a determination module that may determine a source address of a source method data structure within memory at runtime that describes the source method, the source method data structure including a source code pointer to method code of the source method, (4) a modifying module that modifies the application at runtime to have the target class reference the source method in place of the target method by copying at least a portion of the source method data structure from the source address of the source method data structure to the target address of the target method data structure and, thereby, replacing the target code pointer with the source code pointer and (5) at least one processor configured to execute the identification module, the location module, the determination module, and the modifying module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a class-based object-oriented application at runtime that may include a target method to replace at runtime with a source method, (2) locate a target address of a target method data structure within memory at runtime that describes the target method and may be referenced by a target class within the application, the target method data structure including a target code pointer to method code of the target method, (3) determine a source address of a source method data structure within memory at runtime that describes the source method, the source method data structure including a source code pointer to method code of the source method and (4) modify the application at runtime to have the target class reference the source method in place of the target method by copying at least a portion of the source method data structure from the source address of the source method data structure to the target address of the target method data structure and, thereby, replacing the target code pointer with the source code pointer.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
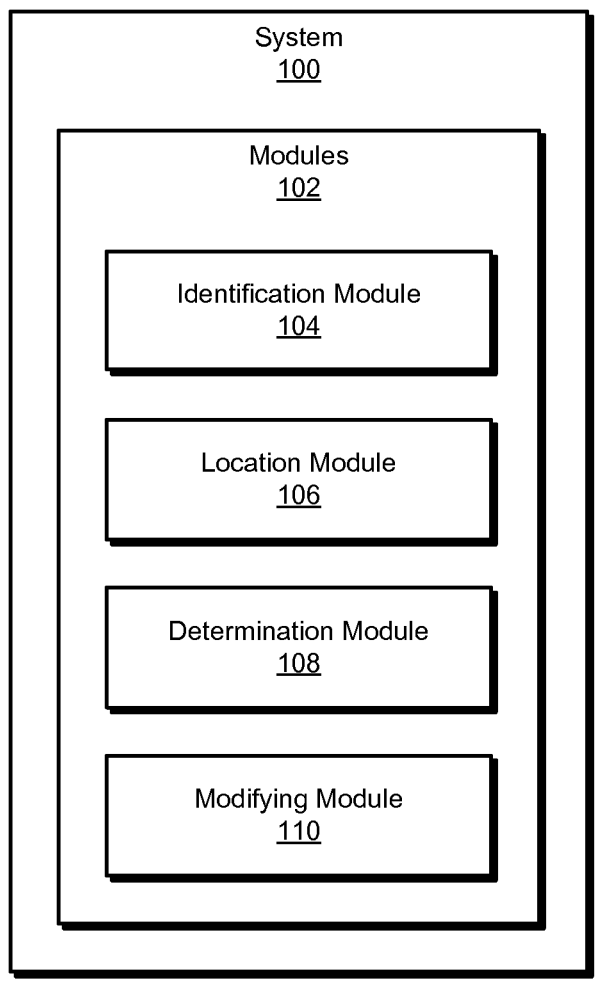
FIG. 1 is a block diagram of an exemplary system for replacing application methods at runtime.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for replacing application methods at runtime. As will be explained in greater detail below, by replacing, in memory, a target method data structure (referenced by a target class) that includes a code pointer to the executable code of a target method with a source method data structure (e.g., referenced by a source class) that includes a code pointer to the executable code of a source method, the systems and methods described herein may facilitate replacing one method of an application with another while the application is loaded in memory. In some examples, this may allow replacing a method with a wrapper method for the method that implements security measures to ensure a safe execution of the method. In some examples, this approach may achieve the replacement of an application method without requiring the decompilation and/or recompilation of any portion of the application. In some examples, this approach may achieve the replacement of an application method on platforms that do not natively support the replacement of an application method, such as a process virtual machine on a mobile computing device. In some examples, these systems and methods may replace an application that runs within a virtual machine without making changes to the virtual machine (but by using data structures and methods provided by the virtual machine).

Figure 2:
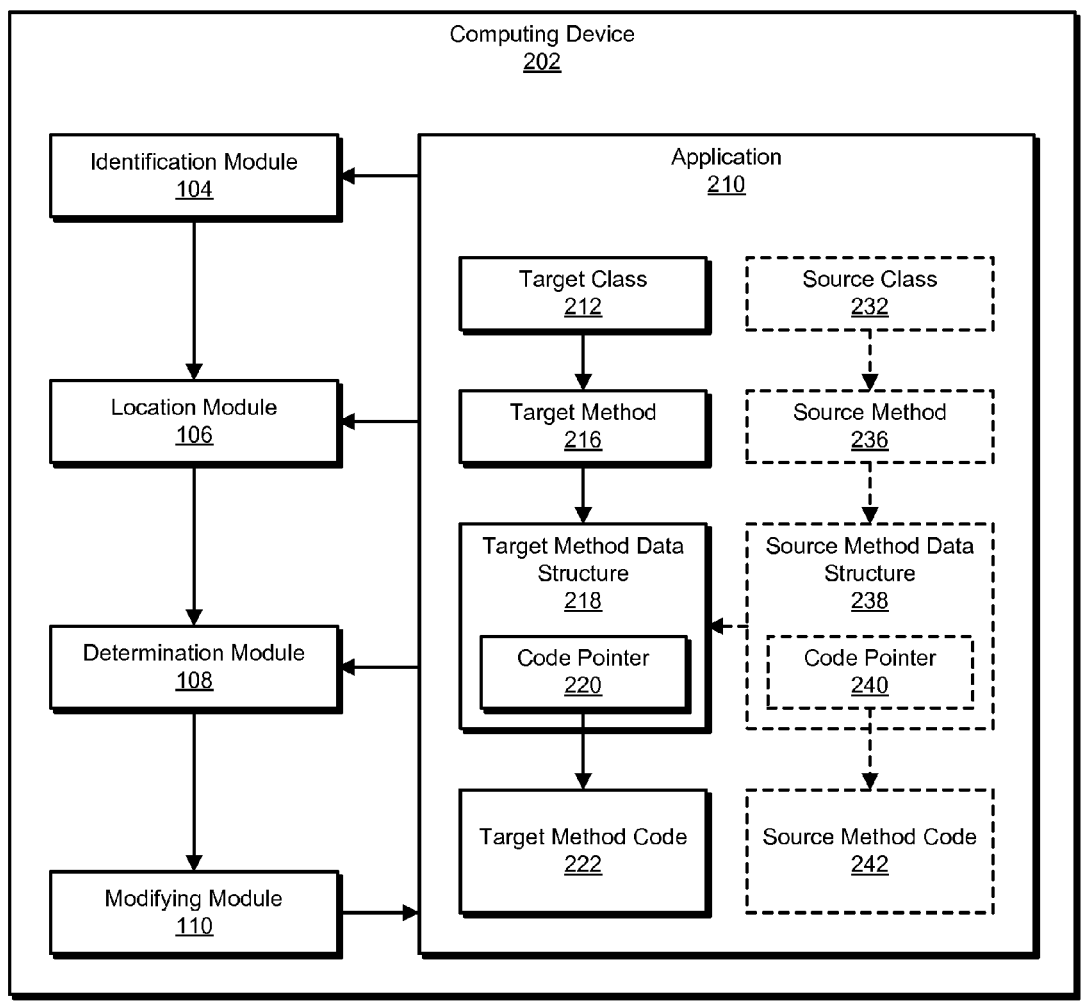
FIG. 2 is a block diagram of an exemplary system for replacing application methods at runtime.

The following will provide, with reference to FIGS. 1-2, detailed descriptions of exemplary systems for replacing application methods at runtime. Detailed descriptions of corresponding computer-implemented methods will also be provided in connection with FIG. 3. Detailed descriptions of exemplary application states will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for replacing application methods at runtime. As illustrated in this figure, exemplary system 100 may include one or more modules 102 for performing one or more tasks. For example, and as will be explained in greater detail below, exemplary system 100 may also include an identification module 104 that may identify a class-based object-oriented application at runtime that may include a target method to replace at runtime with a source method. Exemplary system 100 may additionally include a location module 106 that may locate a target address of a target method data structure within memory at runtime that describes the target method and may be referenced by a target class within the application, the target method data structure including a target code pointer to method code of the target method. Exemplary system 100 may also include a determination module 108 that may determine a source address of a source method data structure within memory at runtime that describes the source method, the source method data structure including a source code pointer to method code of the source method. Exemplary system 100 may additionally include a modifying module 110 that may modify the application at runtime to have the target class reference the source method in place of the target method by copying at least a portion of the source method data structure from the source address of the source method data structure to the target address of the target method data structure and, thereby, replacing the target code pointer with the source code pointer. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 executing an application 210. Computing device 202 may be programmed with one or more of modules 102.

In one embodiment, one or more of modules 102 from FIG. 1 may, when executed by at least one processor of computing device 202, facilitate computing device 202 in replacing application methods at runtime. For example, and as will be described in greater detail below, one or more of modules 102 may cause computing device 202 to replace a target method 216 of a target class 212 with a source method 236 (e.g., of a source class 232). For example, and as will be described in greater detail below, identification module 104 may be programmed to identify a class-based object-oriented application 210 at runtime that may include target method 216 to replace at runtime with source method 236. Location module 106 may be programmed to locate a target address of a target method data structure 218 within memory at runtime that describes target method 216 and may be referenced by target class 212 within application 210, target method data structure 218 including a target code pointer 220 to target method code 222 of target method 216. Determination module 108 may be programmed to determine a source address of a source method data structure 238 within memory at runtime that describes source method 236, source method data structure 238 comprising a source code pointer 240 to source method code 242 of source method 236. Modifying module 110 may be programmed to modify application 210 at runtime to have target class 212 reference source method 236 in place of target method 216 by copying at least a portion of source method data structure 238 from the source address of source method data structure 238 to the target address of target method data structure 218 and, thereby, replacing target code pointer 220 with source code pointer 240.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Figure 3:
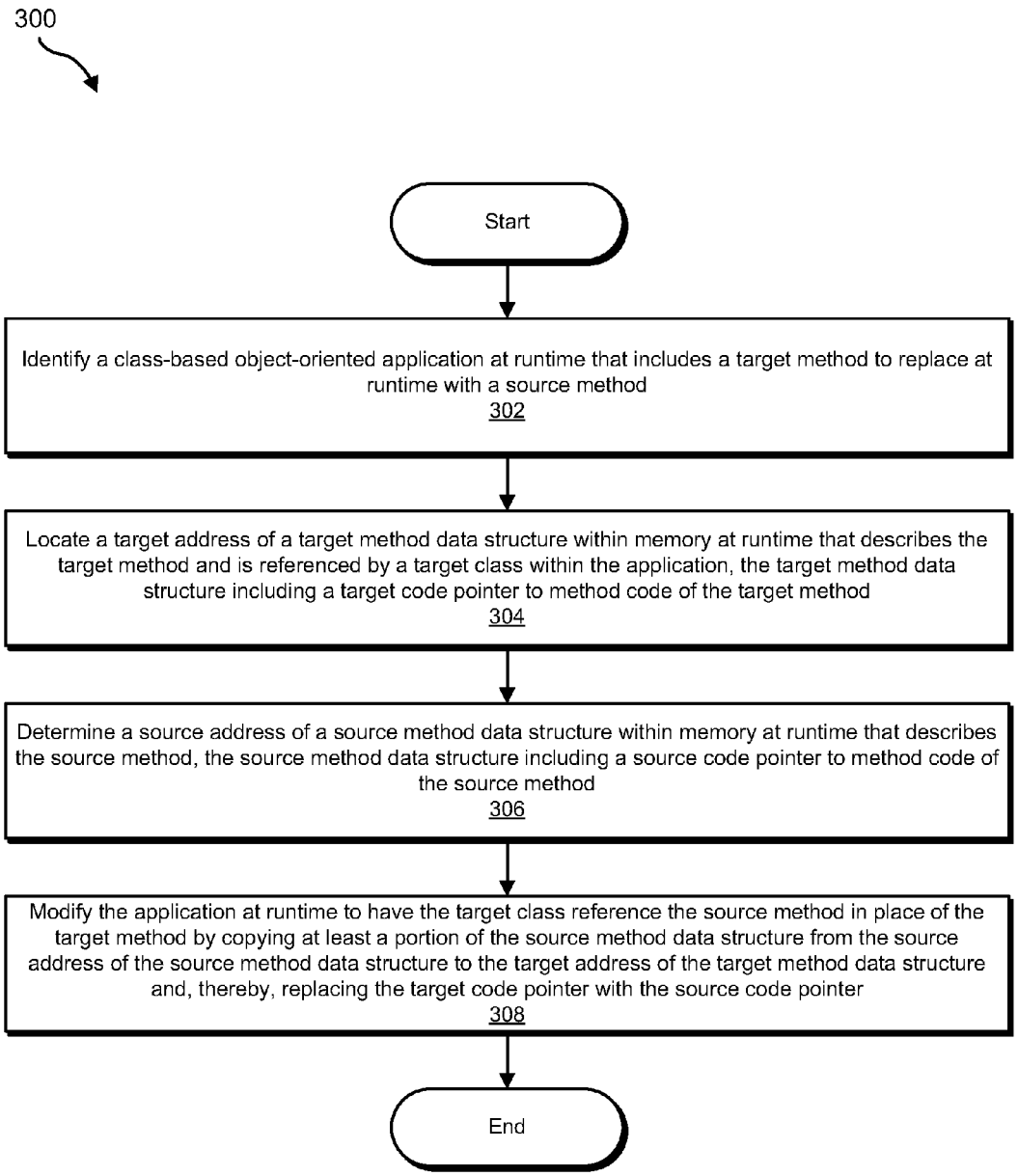
FIG. 3 is a flow diagram of an exemplary method for replacing application methods at runtime.

FIG. 3 is a flow diagram of an exemplary computer-implemented method 300 for replacing application methods at runtime. The steps shown in FIG. 3 may be performed by any suitable computer-executable code and/or computing system.

Figure 6:
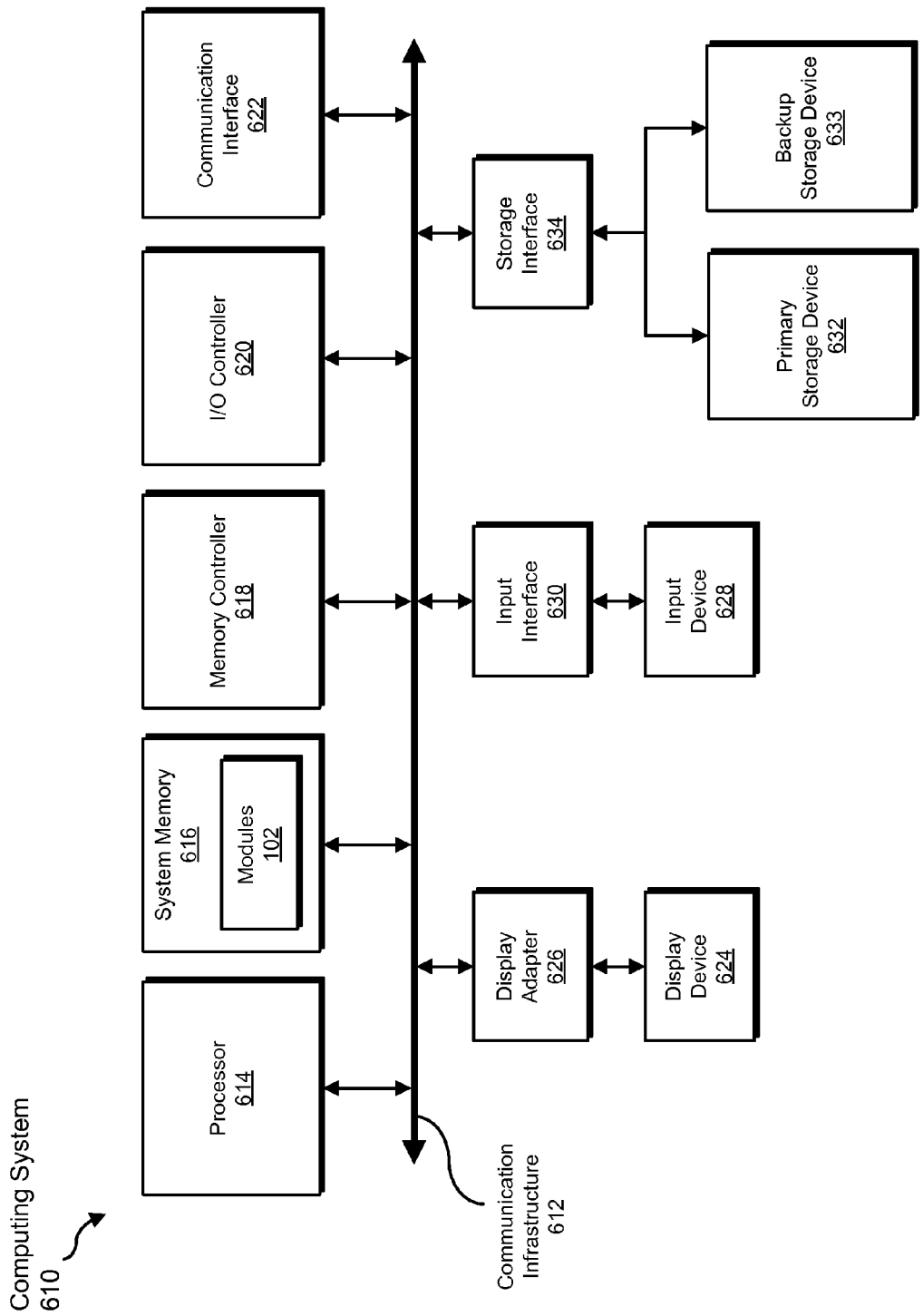
FIG. 6 is a block diagram of an exemplary computing system capable of implementing one or more of the embodiments described and/or illustrated herein.
Figure 7:
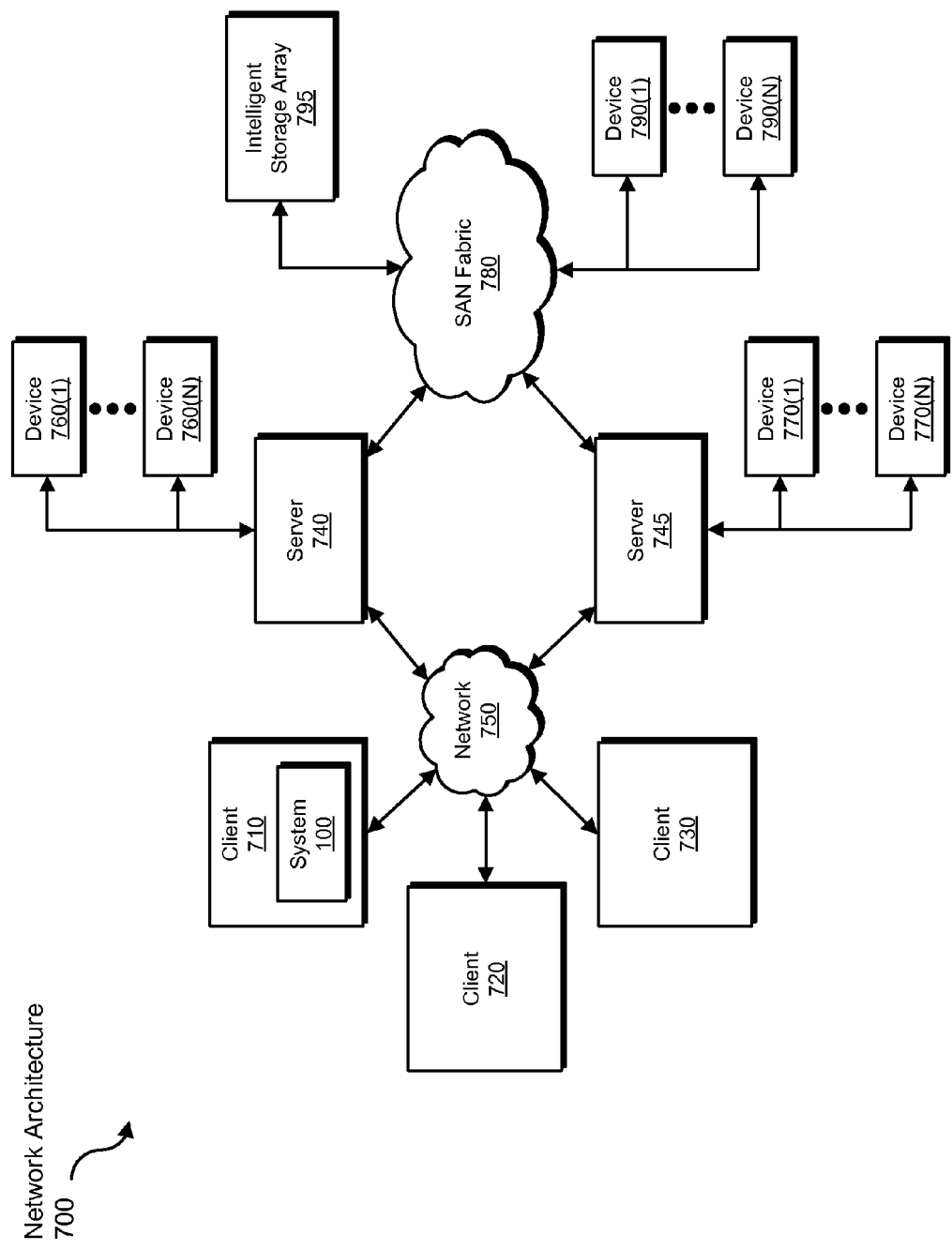
FIG. 7 is a block diagram of an exemplary computing network capable of implementing one or more of the embodiments described and/or illustrated herein.

In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a class-based object-oriented application at runtime that may include a target method to replace at runtime with a source method. For example, at step 302 identification module 104 may, as part of computing device 202 in FIG. 2, identify class-based object-oriented application 210 at runtime that may include target method 216 to replace at runtime with source method 236.

As used herein, the term "application" may refer to any process and/or program. In some examples, the application may execute in a process virtual machine. For example, the application may run on DALVIK which may execute on a GOOGLE ANDROID platform (e.g., a mobile computing device).

As used herein, the term "method" may refer to any method, subroutine, and/or procedure associated with a class defined in a class-based object-oriented application.

Identification module 104 may identify the application at runtime in any suitable manner. For example, identification module 104 may identify the application by executing as a part of and/or in communication with the application. In some examples, identification module 104 may identify the application by referencing one or more constructs defined in the application.

In some examples, identification module 104 may identify a source class that includes the source method. In some examples, as will be explained in greater detail below, the source class may also include a placeholder method that one or more of the systems described herein may use for saving the target method before replacing the target method with the source method. In some examples, identification module 104 may identify an instance of the source class (e.g., an object) in a format that is not consumable by the framework used to execute the application. For example, identification module 104 may identify a jobject for the JAVA NATIVE INTERFACE framework. In these examples, identification module 104 may decode the object for use in the framework in which the application executes. For example, identification module 104 may decode the jobject into an Object structure consumable by DALVIK. For example, identification module 104 may execute the following exemplary code:

Object *objTM=dvmDecodeIndirectRef(env, jniTM);
    Object *objWM=dvmDecodeIndirectRef(env, jniWM);
    Object *objFM=dvmDecodeIndirectRef(env, jniFM);

In the above example, "TM" may refer to the target method, "WM" may refer to the wrapper method (i.e., the source method), and "FM" may refer to a placeholder method. In some examples, "dvmDecodeIndirectRef" may refer to a function of the DALVIK application programming interface ("API").

In some examples, identification module 104 also obtain a pointer for one or more API functions. For example, the internal names of one or more API methods may change across development kit versions (e.g., the ANDROID NATIVE DEVELOPMENT KIT). Accordingly, identification module 104 may identify a list of known names for a function and find a function whose name matches a name on the list. As will be explained in greater detail below, in some examples identification module 104 may identify pointers for additional API functions that the systems and methods described herein may use in the course of replacing the target method with the source method.

In some examples, the name of the source method may match the name of the target method and the parameter set of the source method (e.g., the parameter types, number of parameters, and/or parameter names) may match the parameter set of the target method. In some examples, the exception handling of the source method may also match the exception handling of the target method.

Figure 4:
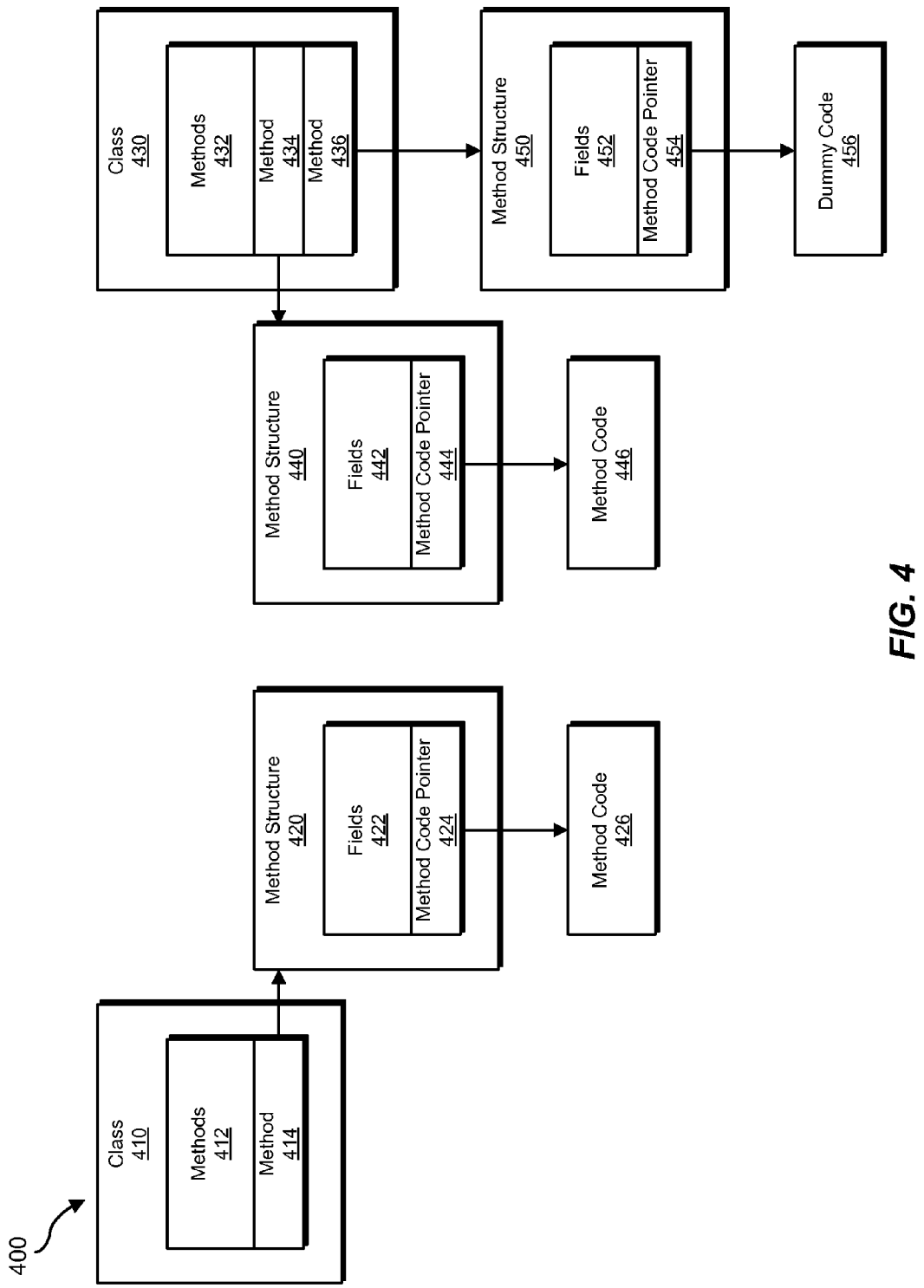
FIG. 4 is a diagram of an exemplary application state before replacing application methods at runtime.

FIG. 4 illustrates an exemplary state 400 of an application. As shown in FIG. 4, the application may include a class 410 that includes methods 412 and a method 414 to be replaced. The application may also include a class 430 that includes methods 432, a method 434 to replace method 414 with, and a method 436. Using FIG. 4 as an example, at step 302 identification module 104 may identify the application in state 400 (e.g., before method 414 has been replaced with method 434).

Returning to FIG. 3, at step 304 one or more of the systems described herein may locate a target address of a target method data structure within memory at runtime that describes the target method and is referenced by a target class within the application, the target method data structure including a target code pointer to method code of the target method. For example, at step 304 location module 106 may, as part of computing device 202 in FIG. 2, locate a target address of a target method data structure 218 within memory at runtime that describes target method 216 and may be referenced by target class 212 within application 210, target method data structure 218 including a target code pointer 220 to target method code 222 of target method 216.

As used herein, the phrase "method data structure" may refer to any data structure that may include metadata describing a method. For example, a method data structure may include one or more fields, including a method code pointer to executable code (e.g., byte code) for a method. In some examples, a method within a class may point to a corresponding method data structure, such that the code referenced by the method code pointer of the method data structure is executed when the method of the class is called.

Location module 106 may identify the location of the target address in any suitable manner. For example, location module 106 may identify the location of the target address by calling an API function. For example, location module 106 may execute the following exemplary code:

Method *tm=dvmGetMethodFromReflectObj(objTM);

As mentioned earlier, one or more of the systems described herein may locate "dvmGetMethodFromReflectObj" by identifying a list of known names for the undocumented function and finding a function whose name matches a name on the list.

Using FIG. 4 as an example, at step 304 location module 106 may identify an address of a method structure 420 in memory. Method structure 420 may include fields 422 describing method 414 and a method code pointer 424 that points to method code 426 of method 414.

Returning to FIG. 3, at step 306 one or more of the systems described herein may determine a source address of a source method data structure within memory at runtime that describes the source method, the source method data structure including a source code pointer to method code of the source method. For example, at step 306 determination module 108 may, as part of computing device 202 in FIG. 2, determine a source address of source method data structure 238 within memory at runtime that describes source method 236, source method data structure 238 comprising source code pointer 240 to source method code 242 of source method 236.

Determination module 108 may identify the location of the source address in any suitable manner. For example, determination module 108 may identify the location of the source address by calling an undocumented API function. For example, determination module 108 may execute the following exemplary code:

Method *wm=dvmGetMethodFromReflectObj(objWM);

Likewise, in some examples, determination module 108 may identify the location of a placeholder address of a placeholder method data structure. For example, determination module 108 may execute the following exemplary code:

Method *fm=dvmGetMethodFromReflectObj(objFM);

Using FIG. 4 as an example, at step 306 determination module 108 may identify an address of a method structure 440 in memory. Method structure 440 may include fields 442 describing method 434 and a method code pointer 444 that points to method code 446 of method 434.

Returning to FIG. 3, at step 308 one or more of the systems described herein may modify the application at runtime to have the target class reference the source method in place of the target method by copying at least a portion of the source method data structure from the source address of the source method data structure to the target address of the target method data structure and, thereby, replacing the target code pointer with the source code pointer. For example, at step 308 modifying module 110 may, as part of computing device 202 in FIG. 2, modify application 210 at runtime to have target class 212 reference source method 236 in place of target method 216 by copying at least a portion of source method data structure 238 from the source address of source method data structure 238 to the target address of target method data structure 218 and, thereby, replacing target code pointer 220 with source code pointer 240.

Modifying module 110 may modify the application to have the target class reference the source method in place of the target method in any suitable manner. In some examples, modifying module 110 may perform one or more steps to prepare the classes and/or methods before copying the source method data structure to the target address.

In some examples, modifying module 110 may determine that the target class is not initialized. In these examples, modifying module 110 may initialize the target class before copying the portion of the source method data structure. Likewise, modifying module 110 may initialize the source class before copying the portion of the source method data structure to the target address. For example, modifying module 110 may execute the following exemplary code:

```
if (objTM->clazz->status != CLASS_INITIALIZED) {
    dvmInitClass(objTM->clazz); // initialize the target class
}
if (objWM->clazz->status != CLASS_INITIALIZED) {
    dvmInitClass(objWM->clazz); // initialize the wrapper class
}
```

In the above example, as mentioned earlier, one or more of the systems described herein may locate "dvmInitClass" by identifying a list of known names for the undocumented function and finding a function whose name matches a name on the list.

In some examples, modifying module 110 may also resolve the target method, source method, and/or placeholder method within their respective classes. For example, on some platforms, methods may typically only be resolved on their first use. However, modifying module 110 may resolve the target method in the target class before copying the source method data structure to the target address by identifying an index of the target method for a reference table of the target class and storing the target address of the target method data structure to a resolved method table at the index. For example, modifying module 110 may execute the following exemplary code:

```
method2ref(fakMethod->clazz->pDvmDex, fakMethod, &ref);
fakMethod->clazz->pDvmDex->pResMethods[ref] = fakMethod;
method2ref(trgMethod->clazz->pDvmDex, trgMethod, &ref);
trgMethod->clazz->pDvmDex->pResMethods[ref] = trgMethod;
method2ref(wrpMethod->clazz->pDvmDex, wrpMethod, &ref);
wrpMethod->clazz->pDvmDex->pResMethods[ref] = wrpMethod;
```

In the above example, "fakMethod" may refer to the placeholder method, "trgMethod" may refer to the target method, and "wrpMethod" may refer to the source method. The method "method2ref" may include a portion of modifying module 110 that finds a method index (in this example, saved to "ref") of the provided method's reference table (e.g. for a DALVIK DEX file).

In some examples, modifying module 110 may first save the target method data structure before overwriting the target method data structure with the source method data structure. For example, modifying module 110 may identify the source class that references the source method data structure that describes the source method. Modifying module 110 may then determine that the source class references a placeholder method data structure that describes a private, non-native placeholder method. Modifying module 110 may then, before copying the portion of the source method data structure to the target address, copy at least a portion of the target method data structure from the target address of the target method data structure to a placeholder address of the placeholder method data structure and, thereby, save the target code pointer for use in the source method. By using a private, non-native placeholder method, the systems described herein may ensure that the runtime environment does not check the class name of the placeholder method to make sure that it matches the class of the target method.

For example, the source method may include a call to the placeholder method of the source class. Accordingly, the source method may include at least one instruction to execute the target method by calling the placeholder method. In some examples, the target method may be untrusted. For example, one or more of the systems described herein (e.g., identification module 104) may have identified the application as an untrusted application. Additionally or alternatively, one or more of the systems described herein may identify the target method as an untrusted method (e.g., created by a third-party). Accordingly, the source method may operate as a wrapper method for the target method with at least one instruction to prevent an insecure use of the target method. For example, the source method may sanitize data from arguments it received when called before passing the sanitized data as arguments to the target method. As another example, the source method may analyze the context in which it was called and/or one or more of the arguments with which it was called to determine whether it is safe to call the target method. For example, the source method may prevent a possible exploit of the target method (e.g., a buffer overflow), an unauthorized use of the target method (e.g., in violation of an access policy, a data loss prevention policy, etc.), and/or any other use of the target method that may pose a security concern.

Modifying module 110 may save the target method data structure to the location of the placeholder method data structure in any suitable manner. For example, modifying module 110 may execute the following exemplary code:
memcpy(fakMethod, trgMethod, size);

Likewise, modifying module 110 may save the source method data structure to the location of the target method data structure in any suitable manner. For example, modifying module 110 may execute the following exemplary code:
memcpy(trgMethod, wrpMethod, size);

In some examples, modifying module 110 may only copy one or more portions of the source method data structure to the location of the target method data structure. For example, modifying module 110 may copy only those fields of the source method data structure necessary to ensure the correct operation of the source method at the location of the target method data structure (e.g., only fields that differed between the source method data structure and target method data structure).

In some examples, modifying module 110 may modify the application at runtime without recompiling the source class and without recompiling the target class.

Using FIG. 4 as an example, method 436 may represent a placeholder method in class 430. Method 436 within class 430 may be described by a method structure 450 that includes fields 452 and a method code pointer 454 that points to dummy code 456 (e.g., no content and/or no significant content). Modifying module 110 may copy method structure 420 to the location of method structure 450, causing a future invocation of method 436 of class 430 (e.g., by method 434, acting as a wrapper method to method 414) to execute method code 426. Modifying module 110 may then copy method structure 440 to the location of method structure 420, causing a future invocation of method 414 of class 410 to execute method code 446 (e.g., so that a wrapper method for method 414 is called instead of method 414 being called directly).

Figure 5:
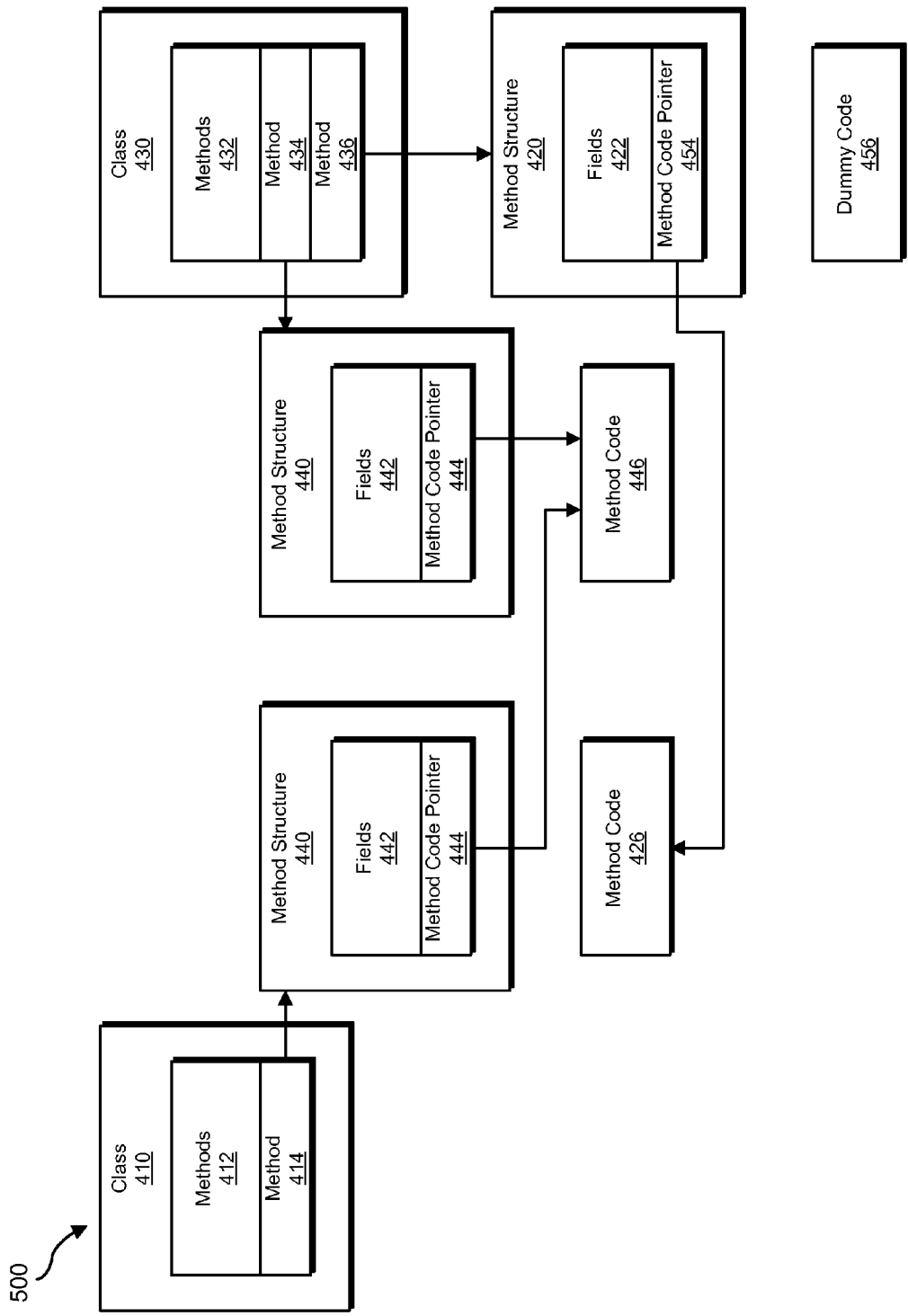
FIG. 5 is a diagram of an exemplary application state after replacing application methods at runtime.

FIG. 5 illustrates an exemplary state 500 of an application after replacing a method. Using FIG. 5 as an example, Method 414 may now point to the contents of method structure 440, including method code pointer 444 that continues to point to method code 446 (e.g., the wrapper method code). Method 436 may now point to the contents of method structure 420, including method code pointer 454 that continues to point to method code 426 (e.g., the original target method code). Accordingly, when method 414 of class 410 is called, method code 446 may be executed, which may perform some security steps to decide how and/or whether to call the original target function. Method code 446 may then call the original target function by calling method 436 (the placeholder method), resulting in the execution of method code 426.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for replacing application methods at runtime.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an application to be transformed, transform the application by replacing an original method with a wrapper method, use the result of the transformation to securely execute the original method, output a further result of securely executing the original method to a display device, and store an additional result of securely executing the original method to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for replacing application methods at runtime, at least a portion of the method being performed by a computing device comprising at least one processor, the method comprising:
    identifying a class-based object-oriented application at runtime that comprises a target method to replace at runtime with a source method that comprises a wrapper method with at least one instruction to prevent an unsecure use of the target method;
    locating, within memory for a DALVIK file, by calling a DALVIK application programming interface reflection function, a target address of a target method data structure at runtime that describes the target method and is referenced by a target class within the application, the target method data structure comprising a target code pointer to method code of the target method;
    determining a source address of a source method data structure at runtime that describes the source method, the source method data structure comprising a source code pointer to method code of the source method;
    modifying the application at runtime to have the target class reference the source method in place of the target method by copying at least a portion of the source method data structure from the source address of the source method data structure to the target address of the target method data structure such that the target code pointer is replaced with the source code pointer.

2. The computer-implemented method of claim 1, further comprising:
    identifying a source class that references the source method data structure that describes the source method;
    determining that the source class references a placeholder method data structure that describes a private, non-native placeholder method.

3. The computer-implemented method of claim 2, wherein the source method comprises at least one instruction to execute the target method by calling the placeholder method.

4. The computer-implemented method of claim 3, wherein: the target method is untrusted.

5. The computer-implemented method of claim 1, wherein the application programming interface reflection function returns a pointer.

6. The computer-implemented method of claim 1, further comprising resolving the target method in the target class before copying the source method data structure.

7. The computer-implemented method of claim 6, wherein resolving the target method in the target class comprises:
    identifying an index of the target method for a reference table of the target class;
    storing the target address of the target method data structure to a resolved method table at the index.

8. The computer-implemented method of claim 1, wherein:
    a name of the source method matches a name of the target method;
    a parameter set of the source method matches a parameter set of the target method.

9. The computer-implemented method of claim 1, wherein modifying the application at runtime to have the target class reference the source method in place of the target method comprises modifying the application at runtime without recompiling a source class that references the source method data structure that describes the source method and without recompiling the target class.

10. A system for replacing application methods at runtime, the system comprising:
    an identification module that identifies a class-based object-oriented application at runtime that includes a target method to replace at runtime with a source method that comprises a wrapper method with at least one instruction to prevent an unsecure use of the target method;
    a location module that locates, within memory for a DALVIK file, by calling a DALVIK application programming interface reflection function, a target address of a target method data structure at runtime that describes the target method and is referenced by a target class within the application, the target method data structure comprising a target code pointer to method code of the target method;
    a determination module that determines a source address of a source method data structure at runtime that describes the source method, the source method data structure comprising a source code pointer to method code of the source method;
    a modifying module that modifies the application at runtime to have the target class reference the source method in place of the target method by copying at least a portion of the source method data structure from the source address of the source method data structure to the target address of the target method data structure such that the target code pointer is replaced with the source code pointer;
    at least one processor configured to execute the identification module, the location module, the determination module, and the modifying module.

11. The system of claim 10, wherein the modifying module also:
    identifies a source class that references the source method data structure that describes the source method;
    determines that the source class references a placeholder method data structure that describes a private, non-native placeholder method.

12. The system of claim 11, wherein the source method comprises at least one instruction to execute the target method by calling the placeholder method.

13. The system of claim 12, wherein:
    the target method is untrusted.

14. The system of claim 10, wherein the application programming interface reflection function returns a pointer.

15. The system of claim 10, wherein the location module also resolves the target method in the target class before copying the source method data structure.

16. The system of claim 15, wherein the location module resolves the target method in the target class by:
    identifying an index of the target method for a reference table of the target class;
    storing the target address of the target method data structure to a resolved method table at the index.

17. The system of claim 10, wherein:
    a name of the source method matches a name of the target method;
    a parameter set of the source method matches a parameter set of the target method.

18. The system of claim 10, wherein the modifying module modifies the application at runtime to have the target class reference the source method in place of the target method without recompiling a source class that references the source method data structure that describes the source method and without recompiling the target class.

19. A non-transitory computer-readable-storage medium comprising one or more computer-readable instructions that, when executed by at least one processor of a computing device, cause the computing device to:
    identify a class-based object-oriented application at runtime that comprises a target method to replace at runtime with a source method that comprises a wrapper method with at least one instruction to prevent an unsecure use of the target method;
    locate, within memory for a DALVIK file, by calling a DALVIK application programming interface reflection function, a target address of a target method data structure at runtime that describes the target method and is referenced by a target class within the application, the target method data structure comprising a target code pointer to method code of the target method;
    determine a source address of a source method data structure at runtime that describes the source method, the source method data structure comprising a source code pointer to method code of the source method;
    modify the application at runtime to have the target class reference the source method in place of the target method by copying at least a portion of the source method data structure from the source address of the source method data structure to the target address of the target method data structure such that the target code pointer is replaced with the source code pointer.

20. The non-transitory computer-readable-storage medium of claim 19, wherein the one or more computer-readable instructions further cause the computing device to:
    identify a source class that references the source method data structure that describes the source method;
    determine that the source class references a placeholder method data structure that describes a private, non-native placeholder method.

* * * * *